United States Patent [19]

Tajima et al.

[11] Patent Number: 5,300,572
[45] Date of Patent: Apr. 5, 1994

[54] MOLDABLE POLYESTER RESIN COMPOSITIONS AND MOLDED ARTICLES FORMED OF THE SAME

[75] Inventors: Yoshihisa Tajima; Kuniaki Kawaguchi; Toshio Nakane, all of Shizuoka, Japan

[73] Assignee: Polyplastics Co., Ltd., Osaka, Japan

[21] Appl. No.: 897,673

[22] Filed: Jun. 12, 1992

[30] Foreign Application Priority Data

Jun. 14, 1991 [JP] Japan .................................. 3-169229
Jun. 24, 1991 [JP] Japan .................................. 3-180152

[51] Int. Cl.$^5$ ............................................. C08L 67/02
[52] U.S. Cl. .................................... 525/167; 528/295
[58] Field of Search ........................ 525/167; 528/295

[56] References Cited

U.S. PATENT DOCUMENTS

| | | | |
|---|---|---|---|
| 3,328,484 | 6/1967 | Alliot-Lugaz et al. | 525/167 |
| 3,435,093 | 3/1969 | Cope | 525/166 |
| 4,798,759 | 1/1989 | Dallman | 428/220 |
| 4,950,717 | 8/1990 | Seymour et al. | 525/172 |
| 4,957,980 | 9/1990 | Kobayashi et al. | 525/425 |
| 5,023,296 | 6/1991 | Moriyama | 525/58 |
| 5,242,737 | 9/1993 | Hagens | 428/156 |
| 5,242,756 | 9/1993 | Hensel | 428/480 |

FOREIGN PATENT DOCUMENTS 0163263 12/1980 Japan .
WO9108263 6/1991 PCT Int'l Appl. .

OTHER PUBLICATIONS

Chemical Abstracts, vol. 74, No. 26, Jun. 28, 1971, Columbus, Ohio, U.S.; abstract No. 143201e.

Primary Examiner—James J. Seidleck
Assistant Examiner—I. Zemel
Attorney, Agent, or Firm—Nixon & Vanderhye

[57] ABSTRACT

Moldable polyester resin compositions and molded articles therefrom include, based on the total weight of all resin components:

(A) between 2 to 98% by weight of a compatibilizing metal sulfonate group-containing aromatic polyester copolymer which is the polycondensation reaction product of (a) an aromatic dicarboxylic acid or its ester-forming derivative, (b) a diol compound or its ester-forming derivative, and (c) an ester-forming compound containing a metal sulfonate group;

(B) between 2 to 98% by weight of an additive resin which is one of (B-I) an olefin copolymer which is the copolymerization reaction product between an olefin with at least one of an $\alpha,\beta$-unsaturated carboxylic acid or its derivative and a vinyl alcohol or its ester, and (B-II) a polyamide resin; and, optionally (C) between 0 to 96% by weight of a non-compatibilizing aromatic polyester resin.

The ester-forming compound containing a metal sulfonate group is preferably incorporated into the main polymer chain of the compatibilizing aromatic polyester resin in an amount between 0.01 to 15 molar percent.

3 Claims, 2 Drawing Sheets

MOLDABLE POLYESTER RESIN COMPOSITIONS AND MOLDED ARTICLES FORMED OF THE SAME

FIELD OF INVENTION

The present invention generally relates to moldable polyester resins and to molded articles formed thereof. In preferred embodiments, the present invention will in the form of a compatible resin blend (alloy) which includes a particular aromatic polyester resin which exhibits enhanced compatibility characteristics with either a particular olefin copolymer resin or a polyamide resin. The compositions of this invention are capable of providing molded articles having desirable surface appearance and mechanical properties.

BACKGROUND AND SUMMARY OF THE INVENTION

Thermoplastic aromatic polyester resins, polyolefin resins and polyamide resins each are well known engineering plastics which exhibit excellent moldability characteristics. Furthermore, these resins exhibit desirable mechanical properties, electrical properties and the like which make them suitable materials for a wide range of end-use applications. Specifically, aromatic polyesters and polyamide resin are known to possess excellent chemical resistance characteristics. While such resins have property characteristics which are desirable, there is still a need for property improvements and/or enhancements, particularly where new end-use applications are identified which require specialized properties.

For example, aromatic polyester resins are frequently required to exhibit greater toughness, impact-resistance, heat-resistance and alkali-resistance properties. Polyamide resins are typically required to have improved water absorption resistance characteristics and increased dimensional stability. Olefins resins such as polyethylene and polypropylene, on the other hand, generally are relatively light-weight, and possess excellent chemical resistance and flexibility characteristics. Olefin resins, however, typically lack strength and rigidity which sometimes precludes their use in certain end-use applications where strength and rigidity are requisite attributes of the engineering plastic.

Aromatic polyester and polyolefin resins have relatively poor affinity for one another. Thus, when such resins are formed as distinct layers or regions in a composite article (such as a co-extruded laminated film structure having respective layers of an aromatic polyester and a polyolefin), there is a tendency for the composite article to delaminate along the boundary region between the aromatic polyester layer and the polyolefin resin layer due to poor adherence characteristics.

Generally, blending of resins so as to achieve a desirable set of property attributes has typically been thought to be useful for solving or reducing the problems associated with any one individual resin. For example, the homogenous blending of an aromatic polyester resin and a polyolefin resin would be expected to compensate for the drawbacks associated with the respective resins so as to achieve a composition having improved fusability and bondability. However, the compatibility of aromatic resins and polyolefin resins is so poor that even when melt-blended with one another, it is difficult to obtain a homogenous dispersion. In particular, when injection molded articles are formed from a blend of an aromatic polyester and a polyolefin, severe surface peeling occurs due to an inhomogeneous blend. The resulting mechanical properties of such a blend are also significantly lower than what might otherwise be expected. These problems, therefore, tend to limit the practical value of such a resin blend.

Various proposals have been made in order to obtain a homogenous dispersion of an aromatic polyester resin and a polyolefin resin by improving their compatibility characteristics. In this regard, it has been proposed that a modified polyolefin copolymer be employed which contains comonomeric units introduced into the polymer's backbone for the purpose of enhancing the compatibility between the polyester and polyolefin resins. Although such a "compatibilizing agent" does improve the compatibility of polyester and polyolefin resins to some extent, further improvements in terms of dispersibility and mechanical properties are needed.

Blending of an aromatic polyester resin and a polyamide resin is considered useful in order to improve not only the heat-resistance properties of the aromatic resin, but also to improve the water absorption resistance properties of the polyamide resin. It might be expected, therefore, that a composition which contains both an aromatic polyester resin and a polyamide resin would benefit from the advantageous properties, such as mechanical strength and the like, attributable to each of the resin components. The present applicants, however, have determined that the compatibility of aromatic polyester and polyamide resins is so poor that, when simply melt-blended with one another, it is difficult to obtain a homogeneous dispersion, which results in substantially lower mechanical strength properties than would otherwise be expected. Like the aromatic polyester and olefin blend discussed above, an inhomogeneous blend of an aromatic polyester and a polyamide will result in significant surface peeling on injection-molded articles. As a result, the practical value of such a blend is questionable.

What has been needed therefore is a better compatibilization technique to enable aromatic polyesters to be blended sufficiently with either a polyolefin or a polyamide resin. It is towards fulfiling such a need that the present invention is directed.

Broadly, the present invention is embodied in moldable polyester resin compositions which contain a modified aromatic polyester copolymer having metal-sulfonate-containing units introduced into the copolymer's backbone structure. Such an aromatic polyester copolymer has been found to be highly compatible with both polyolefin and polyamide resins, and serves as a compatibilizer when an unmodified (i.e., one not containing metal-sulfonate units) aromatic polyester is further blended with the modified polyester copolymer and either a polyolefin or a polyamide resin.

Preferred embodiments of this invention will include, based on the total weight of the resin components:

(A) between 2 to 98% by weight of a modified aromatic polyester copolymer containing a metal sulfonate group which is the polycondensation reaction product of (a) an aromatic dicarboxylic acid or its ester-forming derivative, (b) a diol compound or its ester-forming derivative, and (c) an ester-forming compound containing a metal sulfonate group;

(B) between 2 to 98% by weight of one of (B-I) an olefin copolymer produced by copolymerizing an olefin with at least one of an α,β-unsaturated carboxylic acid or its derivative and a vinyl alcohol or its ester, and (B-II) a polyamide resin; and, optionally (C) between 0 to 96% by weight of an unmodified aromatic polyester resin.

By the term "modified aromatic polyester" is meant to refer to an aromatic polyester copolymer having metal-sulfonate-containing units as part of its backbone. On the other hand, by the term "unmodified aromatic polyester" is meant to refer to aromatic polyesters which do not include such metal-sulfonate-containing units as part of their backbone structures.

Further aspects and advantages of this invention will become more clear after careful consideration is given to the detailed description of the preferred exemplary embodiments which follow.

BRIEF DESCRIPTION OF THE ACCOMPANYING DRAWINGS

Reference will hereinafter be made to the accompanying drawings wherein.

Figure 3:
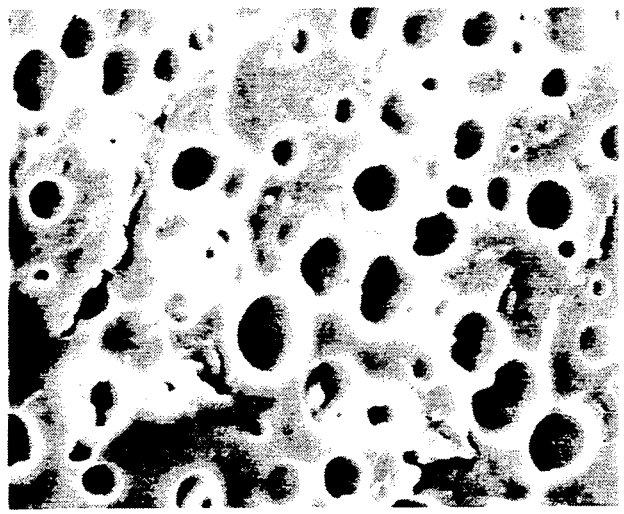
Figure 4:
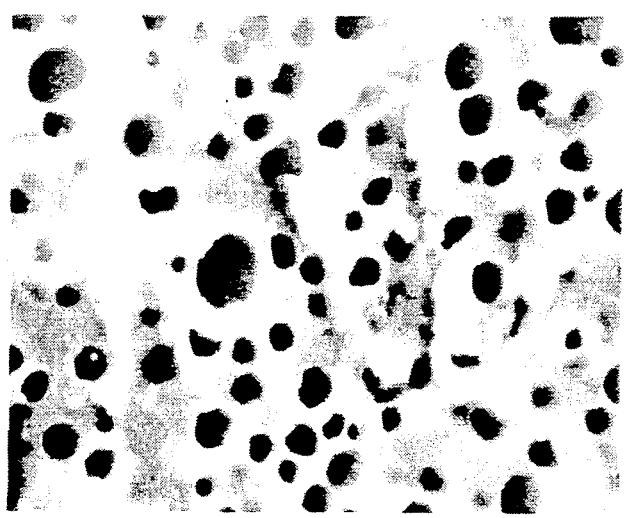

FIG. 3 is an electron photomicrograph showing a representative particle structure in a dispersed state of a conventional composition which is outside the scope of this invention and which was prepared in accordance with Example 3 below; and FIG. 4 is an electron photomicrograph showing a representative particle structure in a dispersed state associated with another composition according to this invention which was prepared in accordance with Example 13 below.

DETAILED DESCRIPTION OF THE PREFERRED EXEMPLARY EMBODIMENTS

The modified aromatic polyester resin which contains a metal sulfonate group (hereinafter sometimes referenced as "component (A)") that may be used in the compositions of the present invention is a saturated polyester resin produced by polycondensing (a) various dicarboxylic acids or their ester-forming derivatives with (b) various diols or their ester forming derivatives in the presence of (c) an ester-forming monomer containing a metal sulfonate group (which will be described in greater detail below).

The dicarboxylic acid or its ester-forming derivative constituting monomer (a) used to form component (A) may be at least one member selected from those mainly composed of terephthalic acid, isophthalic acid, 2,6- or 2,7-naphthalenedicarboxylic acid and their lower alcohol esters and further comprising 4,4-diphenyldicarboxylic acid, adipic acid, sebacic acid, cyclohexanedicarboxylic acid and their lower alcohol esters.

The diol component constituting monomer (b) used to form component (A) is at least one member selected from among diols such as ethylene glycol, 1,3-propanediol, 1,4-butanediol, 1,4-cyclohexanedimethanol, polyoxyetheylene glycol, polyoxypropylene glycol and polyoxybutylene glycol, and their ester forming derivatives.

Component (A) may be a polyester copolymer having a crosslinked or branched structure produced by using, as its constituent monomer (a) or (b), trifunctional or higher ester-forming compounds, for examples, trimesic acid, trimellitic acid, pyromellitic acid or the like or their ester-forming derivatives as monomer (a) in combination with a small amount of glycerin, trimethylolpropane, pentaerythritol or the like as the monomer (b).

The polyester of component (A) that may be used in the compositions of the present invention is a polyester that is especially characterized by having a metal sulfonate group which is produced by the further addition of an ester-forming compound having a metal sulfonate group as the monomer component (c) to the above-described monomers (a) and (b) and then subjecting the mixture to the polycondensation reaction conditions.

The monomer component (c) that may be added for this purpose is an aromatic carboxylic acid having a metal sulfonate group or its lower alkyl ester or alcohol represented by the following general formula (I) and/or II:

$$(XOCO)_m-Ar-(SO_3M)_n \quad (I)$$

$$(HORO)_m-Ar-(SO_3M)_n \quad (II)$$

wherein -Ar- represents a benzene ring or a naphthalene ring; X represents a hydrogen atom or a lower alkyl group; m and n are each 1 or 2; M represents an alkali metal selected from lithium, sodium and potassium, with the proviso that when n is 2, the M moieties may be the same or different; and R represents a divalent group selected from $-CH_2CH_2-$, $-CH(CH_3)CH_2-$, $-CH_2CH(CH_3)-$ and $-CH_2CH_2OCH_2CH_2-$.

In the polycondensation reaction of the polyester used as component (A), the monomer component (c) may be added simultaneously with the addition of monomer components (a) and (b). Alternatively, monomer component (c) may be added at any time before the polycondensation reaction is completed. However, the addition of monomer component (c) is preferably performed at the earlier stage possible in the polycondensation reaction. It is particularly preferred to add the monomer component (c) before the esterification or transesterification of the monomer components (a) and (b).

When m is 1 for the monomer component (c) having a metal sulfonate group represented by the formulas (I) or (II), the number of esterifying functional groups will therefore also be 1. In such a case, the monomer component (c) should be introduced as a terminal group of the backbone chain for component (A). On the other hand, when the compound (c) is difunctional, that is, m is 2, a copolymer wherein the functional groups have randomly been introduced as a comonomeric component into the main chain is obtained. In the present invention, the polyester of component (A) may be either case. Furthermore, the monomer component (c) may comprise a combination of two monomers represented by the formulas (I) and (II).

The amount of units derived from the monomer component (c) constituting the polyester component (A) is between 0.01 to 15% by mole, preferably between 0.1 to 10% by mole, based on the entirety of the ester constituent units. The content of units derived from the monomer component (c) in the polyester component (A) can be controlled by regulating the amount of addition f the monomers represented by the formulas (I) and/or (II). A composition having optimal properties can be produced by properly changing the content of the units derived from the monomer component (c) in the component (A) according to the purpose of the invention or according to the kind and amount of the other components of the composition with the above-described respective ranges.

When the content of the units derived from the monomer component (c) in the polyester component (A) is less than 0.01% by mole, no improvements in terms of compatibility and dispersibility (which is a main purpose of the present invention) can be attained. On the other hand, when such content exceeds 15% by mole, polymers with insufficiently low degrees of polymerization are produced which has an adverse effect on the mechanical properties of the composition.

The most typical example of the polyester usable as the component (A) is a polyester (co)polymer containing aromatic ester-forming units having sodium sulfonate groups and mainly composed of units of ethylene terephthalate, butylene terephthalate, butylene terephthalate isophthalate, cyclohexanedimethylene terephthalate, butylene 2,6-naphthalate, butylene 2,7-naphthalate or the like.

The polyolefin resin that may be used as the component (B-I) in the compositions of the present invention is an olefin copolymer produced by copolymerizing an olefin with at least one of an $\alpha,\beta$-unsaturated carboxylic acid or its derivative and vinyl alcohol or its ester. The olefin constituting the olefin copolymer comprises at least one member selected from $\alpha$-olefins, for example, ethylene, propylene, butene-1, hexane-1, 4-methylbutene-1, 4-methylpentene-1, and the like, particularly ethylene, propylene and butene-1. The $\alpha,\beta$-unsaturated carboxylic acid or its derivative as the comonomer component is, for example, acrylic acid, methacrylic acid, ethacrylic acid, maleic acid, fumaric acid or their metal salts (e.g., with Group I or II metals) or alkyl ester, glycidyl ester, anhydride, imide or the like. Furthermore, it may be vinyl alcohol or its ester such as vinyl acetate. At least one of the above-described comonomer components is introduced as a component of copolymerization (including graft copolymerization and block copolymerization) into a polyolefin polymer so as to obtain the polyolefin component (B-I).

The polyolefin component (B-I) may be a polyolefin copolymer or a polyolefin elastomer mainly composed of the above-described copolymer and which is further copolymerized with other vinyl monomers (for example, styrene, butadiene, acrylonitrile or the like). Furthermore, use may be made of any of copolymers, terpolymers and block polymers containing a small amount of a crosslinking agent or other modifier. The polyolefin resin may not only have a linear molecular structure, but also a branched or crosslinked structure. There is no particular limitation on the degree of polymerization provided that the polymer is moldable. It is also possible to use the above-described olefin copolymers in a combination of two or more of the same.

Particularly preferred examples of the olefin copolymer that may be used as component (B-I) include a copolymer of ethylene with a metal salt of methacrylic acid or acrylic acid (the metal may be, for example, lithium, sodium, potassium, calcium, magnesium or zinc), a copolymer of ethylene with methacrylic acid or acrylic acid, a copolymer of propylene with maleic acid or maleic anhydride and a copolymer of ethylene with vinyl acetate or its saponificate.

The polyamide resin that may be used as the component (B-II) in the compositions of the present invention is one produced by known techniques, such as polycondensation of various diamines with a dibasic acid, ring opening polymerization of various cyclic amides, polycondensation of various $\omega$-amino acids or the like, any one of which can be used in the present invention. Specific representative examples include polyamide such as nylon 66, nylon 6, nylon 612, nylon 11, nylon 12 and nylon 46, thermoplastic polyamide copolymers or polyamide elastomers mainly composed of such polyamides, and mixtures thereof. Furthermore, use may be made of any copolymer, terpolymer and block polymer containing a small amount of a crosslinking agent or other modifier. The polyamide resin may have either a linear molecular structure, or a branched or crosslinked structure. There is also no particular limitation on the degree of polymerization provided that the polymer is moldable.

It is also possible to further incorporate, besides the polyester (A) containing a metal sulfonate group, an unmodified aromatic polyester resin (C) to the polyester composition of the present invention. However, the inclusion of component (C) is not necessarily an indispensable component.

All the polyesters consisting of the monomers (a) and (b) along used to form the polyester component (A) may generally be used as the unmodified aromatic polyester resin of component (C). Representative examples thereof include polyethylene terephthalate, polybutylene terephthalate, polycyclohexanedimethylene terephthalate, a compolymer mainly composed of such resins, or a thermoplastic elastomer copolymerized with an oxyalkylene glycol having a high molecular wight, as well as liquid crystalline polyester resins.

According to one embodiment of the compositions within the scope of the present invention (hereinafter sometimes referred to as "Composition I"), the proportions of the components (A), (B-I) and (C) are respectively between 2 to 98% by weight, between 2 to 98% by weight and between 0 to 96% by wight based on 100 parts by weight in total of the components (A), (B-I) and (C) is preferably between 5 to 95% by weight while the amount of the component (B-I) is preferably between 5 to 95% by weight. When the amount of the component (B-I) is excessively small, no improvements in the mechanical properties, such as impact resistance, of the polyester resin composition can be attained. On the other hand, when the amount is excessively large, properties inherent in the polyester resin generally are lost and, in particular, the resin's rigidity is unfavorably lost. The amount of the component (B-I) which is blended with the other components is preferably between 5 to 50% by weight.

Although the ratio of the component (A) to the component (C) varies depending upon the content of the metal sulfonate unit in the component (A), at least the component (A) should be present in the composition in an amount of 2% by weight or more, and preferably 5% by weight or more, based on the total weight of the resin components from the viewpoint of improving dispersibility. When the content of the metal sulfonate unit in the component (A) is relatively low within the above-described range, it is preferred to reduce the amount of incorporation of the component (C) in the composition. On the other hand, when the content of the metal sulfonate unit is relatively high within the above-described range, it is possible to reduce the amount of component (A) and increase the amount of component (C) in the composition. In this case, the molecular weight of component (A) may be relatively low.

As described above, when the general aromatic polyester resin component (C) is merely melt-blended with the polyolefin resin (B-I), not only is the dispersion between such components poor (i.e. so that a minor component resin phase exists as large particles and appears as a striped or lamellar phase separation structure on the surface of an injection molded article), but also peeling of the surface layer is liable to occur due to friction. The reason for this is believed to be that the aromatic polyester resin (C) and the polyolefin resin (B-I) phase are deformed due to high shear forces in the vicinity of the surface layer during injection molding to thereby form a layered structure. Peeling of the surface layer thus apparently occurs due to poor affinity and adhesion between the aromatic polyester resin (C) phase and the polyolefin resin (B-I) phase. On the other hand, the use of a modified aromatic polyester as component (A) which contains a metal sulfonate group according to this invention significantly improves the dispersibility of each resin component, enables dense and homogeneous dispersions to be attained, prevents the formation of a layered structure of both phases, and improves the adhesion between both components. As a result, molded articles having good surface appearance characteristics can be produced. The improvement in dispersion can be confirmed by the presence of very fine and homogeneous dispersed particles of a minor component in the composition when a section of the molded article of the composition according to the present invention is observed under an electron microscope (see Examples).

According to another embodiment of a composition within the scope of the present invention (sometimes referred to as "Composition II"), the proportions of the components (A), (B-II) and (C) are respectively between 2 to 98% by weight, between 2 to 98% by weight and between 0 to 96% by weight based on 100 parts by weight of all components (A), (B-II) and (C). The total amount of the components (A) and (C) is preferably between 5 to 95% by weight while the amount of the component (B-II) is preferably between 5 to 95% by weight. When the amount of the component (B-II) is excessively small, no improvements in the composition's mechanical properties, such as impact resistance can be attained. On the other hand, when the amount is excessively large, properties inherent in the polyester resin are lost and the deleterious influence of moisture absorption increases. The amount of component (B-II) which is blended with the other components preferably between 5 to 50% by weight.

Although the ratio of the component (A) to the component (C) varies depending upon the content of the metal sulfonate unit in the component (A), component (A) should be present in the composition in an amount of at least 2% by weight or more, preferably 5% by weight or more based on the total weight of the resin components from the viewpoint of improving dispersibility. When the content of the metal sulfonate unit in the component (A) falls within the above-described range but is relatively low, it is preferred to reduce the amount of incorporation of the component (C). On the other hand, when the content of the metal sulfonate unit falls within the above-described range but is relatively high, it is possible to reduce the amount of component (A) and increase the amount of component (C). In this case, the molecular weight of component (A) may be relatively low.

As described above, when the unmodified aromatic polyester resin of component (C) is merely melt-blended with the polyamide resin (B-II), not only does the dispersed minor component resin phase appear as as striped phase separation structure on the surface of an injection molded article, but also the surface layer often peels due to friction. The reason for this is believed to be that the unmodified aromatic polyester resin component (C) and the polyamide resin component (B-II) phases are deformed due to a high shear force occurring in the vicinity of the surface layer during injection molding to form a layered structure. Peeling of the surface layer thus often occurs due to poor affinity and adhesion between the aromatic polyester resin component (C) phase and the polyamide resin component (B-II) phase. On the other hand, the use or combined use of a modified aromatic polyester component (A) containing a metal sulfonate group according to the present invention improves the dispersibility of each resin component, enables dense and homogeneous dispersion to be attained, prevents the formation of a layered structure of both component phases, and improves the adhesion between the components. Therefore, molded articles having good surface appearance characteristics can be produced. The improvement in dispersion can be confirmed by the presence of very fine and homogeneously dispersed particles of a minor component in the composition when a section of the molded article of the composition according to the present invention is observed under an electron microscope (see Examples).

Conventional additives, for example, lubricating agents, slip additives, nucleating agents, dyes and pigments, release agents, antioxidants, heat stabilizers, weather (light) stabilizers, hydrolysis stabilizers, inorganic or organic reinforcements or fillers and other thermoplastic resins may be incorporated in the resin compositions of the present invention for the purpose or imparting desired properties in such an amount as will have no significant adverse effect on the other composition components and/or attributes.

The compositions of the present invention can be produced by various known processing techniques. In this regard, it is preferred to melt-blend the components according to the present invention (that is, the aromatic polyester resin component (A) and the polyolefin component (B-I) or the polyamide resin component (B-II), and if needed, the polyester component (C)) by kneading a melt of such components for 30 seconds or more. Other components as well may be simultaneously or separately incorporated into the melt. More specifically, after the individual resin components have been subjected to homogeneous mixing by means of a kneader such as a tumbler or a Henschel mixer, the mixture may be fed into a single screw extruder or a twin screw extruder where melt-blending is performed. The blended and kneaded product may then be pelletized and molded. Alternatively, the melt-blended composition may be directly molded.

The melt-blending is preferably conducted at a temperature sufficient to render all of the resin components molten and under a shear rate of 40 sec$^{-1}$ or more, and preferably between 100 to 500 sec$^{-1}$. The melt-blending temperature is preferably 5° to 100° C. above the melt temperature of the highest melting resin component, and preferably 10° to 60° C. above such melt point. When the melt-blending temperature is excessively high, decomposition or abnormal reactions may unfavorably occur. The melt-blending residence time is at least 30 seconds to 15 minutes, and preferably between 1 to 10 minutes.

Composition I of the present invention has a structure wherein an aromatic polyester resin and a polyolefin resin are homogeneously and finely dispersed with one another. Such a composition provides a molded article having reduced surface layer peeling. The composition further exhibits improved bonding when used to produce composite molded article.

Composition II of the present invention has a structure wherein an aromatic polyester resin and a polyamide resin are homogeneously and finely dispersed in one another. Such a composition provides a molded article having reduced surface layer peeling, smooth surface, and excellent mechanical properties.

EXAMPLES

The present invention will now be described in more detail with reference to the following non-limiting Examples.

A. Composition I

Figure 1:
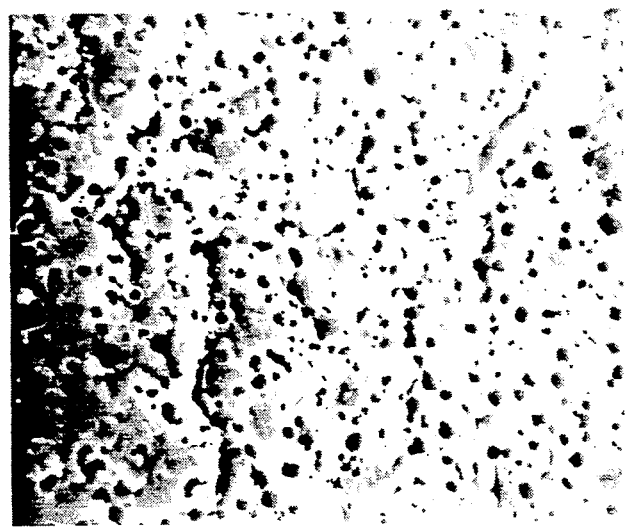
FIG. 1 is an electron photomicrograph shwing a representative particle structure in a dispersed state associated with a composition according to this invention which was prepared in accordance with Example 2 below.

Evaluations and measurements were performed by the following techniques:

Evaluation of resin dispersibility: When the polyolefin resin (B-I) was a minor component, the dispersion state (average particle diameter in the case of particle dispersion) of the polyolefin resin (B-I) was evaluated by breaking pellets in liquid nitrogen, placing the broken pellets in a xylene solution, refluxing the mixture at 130° C. for 12 hours to elute the polyolefin resin (B-I) and observing the resultant holes under an electron microscope. The denser the dispersion (the smaller the average particle diameter), the better the dispersibility of the polyolefin resin (B-I). A representative state of particle dispersion (Example 2) according to the present invention is shown in FIG. 1. The state of particle dispersion (Comparative Example 3) corresponding to this case which is outside the scope of the present invention is shown in FIG. 3.

When the polyester component (A+C) was a minor component, the pellets were crushed or cut and treated in a a 1 N aqueous NaOH solution at 60° C. for 24 hours to decompose and elute the polyester, and the resultant holes were evaluated in the same manner as that described above.

Tensile strength and elongation: The tensile strength and elongation were measured according to ASTM D638.

Notched Izod impact value: The notched Izod impact value was measured according to ASTM D256.

Surface peeling test: An adhesive-backed tape was adhered to the gate of a tensile specimen and peeled off to determine whether or not peeling occurred.

Fusibility: A 1 mm-thick film was prepared as 250° C. by means of a pressing machine and put on a mating resin film specified in the Table, and they were fused to each other at 250° C. for 2 min under a pressure of 50 kg/cm² by means of the pressing machine. The laminate was rapidly cooled to give a sample having a thickness of 1 mm, which was then subjected to evaluation of the fusibility according to JIS C6481.

Production Example of Polyester Copolymer (A)

A reaction vessel provided with an agitator and a distillate tube was charged with (a) dimethyl terephthalate, (b) 1,4-butanediol and (c) sodium dimethyl 5-sulfoisophthalate (in an amount of 0.1% by mole, 1% by mole or 5% by mole based on the total amount of the components (a)+(c)) and titanium tetrabutoxide as a catalyst and air in the reaction system was sufficiently purged with nitrogen. The temperature of the system was raised to almost complete transesterification until the temperature reached 240° C. (90% or more of the theoretical amount of methanol was distilled). The reaction system was then evacuated, and the polycondensation reaction was continued under 0.1 Torr for 2.5 hours to give three kinds of modified PBT copolymers containing a sodium-sulfonate-containing isophthalic acid residue in respective amounts of 0.1% by mole, 1% by mole and 5% by mole (A-1, A-2 and A-3).

A modified PET (sodium sulfonate content: 1% by mole) (A-4) was prepared in the same manner as that used in the preparation of (A-2), except that ethylene glycol was used as the component (b). Polycondensation was conducted in the same manner as that described in the preparation of (A-2), except that sodium p-dihydroxyethoxyphenylsulfonate was used as the component (c) in an amount of 1% by mole based on the component (a) (A-5).

EXAMPLES 1 TO 5

According to the formulations specified in Table 1, (A) a polybutylene terephthalate copolyester resin copolymerized with a sodium 5-sulfoisophthalate (SIP) component in an amount of 0.1% by mole, 1.0% by mole or 5% by mole (A-1, A-2 and A-3), (B-I) a copolymer of ethylene with zinc methacrylate (Himilan manufactured by DuPont-Mitsui Polychemical Co., Ltd.) (B-1) and, if necessary, (C) polybutylene terephthalate (PBT) (manufactured by Polyplastics Co., Ltd.) were mixed with each other in proportions specified in Table 1. The mixture was melt-kneaded by means of a 30-mm twin screw extruder at a preset temperature of 245° C. and a speed of rotation of a screw of 80 rpm and then pelletized. Subsequently, a specimen was prepared from the pellet by means of an injection molding machine, and properties were evaluated. The results are given in Table 1.

COMPARATIVE EXAMPLES 1 TO 3

For comparison, a composition consisting of a modified PBT (A) alone, a composition consisting of polybutylene terephthalate (PBT) (C) alone and a composition comprising a two-component system of the components (B-I) and (C) free from the modified PBT (A) were evaluated in the same manner as that described in the above-described Examples. The results are also given in Table 1.

TABLE 1

|  | Unit | Ex. 1 | Ex. 2 | Ex. 3 | Ex. 4 | Ex. 5 | Comp. Ex. 1 | Comp. Ex. 2 | Comp. Ex. 3 |
| --- | --- | --- | --- | --- | --- | --- | --- | --- | --- |
| (A) SIP-modified PBT | pt. wt. | 75 (A-1) | 75 (A-2) | 75 (A-3) | 10 (A-2) | 10 (A-3) | — | 100 (A-2) | — |

TABLE 1-continued

|  | Unit | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|
| SIP content | mol % | 0.1 | 1 | 5 | 1 | 5 | — | 1 | — |
| (B-I) B-1 | pt. wt. | 25 | 25 | 25 | 25 | 25 | — | — | 25 |
| (C) PBT | pt. wt. | — | — | — | 65 | 65 | 100 | — | 75 |
| dispersed particle diameter | μm | 0.5 | 0.3 | 0.1 | 0.6 | 0.5 | — | — | 2.0 |
| tensile strength | kg/cm$^2$ | 498 | 491 | 496 | 495 | 493 | 567 | 560 | 486 |
| tensile elongation | % | 105 | not broken | not broken | 130 | 130 | not broken | 47 | 24 |
| notched Izod impact value | kg.cm/cm | 11.2 | 16.5 | 8.5 | 15.1 | 10.8 | 3.8 | 2.6 | 4.1 |
| surface layer peeling |  | free | free | free | free | free | free | free | peeled |
| fusibility (to PBT) | kg/cm | >4 | >4 | >4 | >4 | >4 | >4 | >4 | >4 |
| fusibility (to polyethylene) | kg/cm | 1.5 | 2.2 | 3.5 | 1.7 | 1.7 | 0.3 | 0.4 | 0.5 |

EXAMPLES 6 to 11 AND COMPARATIVE EXAMPLES 4 TO 8

Molded pieces were prepared and evaluated in the same manner as that used in the above-described Examples 1 to 5 and Comparative Examples 1 to 3, except that the amount of blending of the components (A), (B-I) and (C) were varied as specified in Table 2. The results are given in Table 2.

in one case, the component (A) was changed to a modified polyethylene terephthalate resin (PET) (SIP: 1% by mole) (A-4) and, in another case, a copolymer of ethylene with vinyl alcohol (Kuraray Eval manufactured by Kuraray Co., Ltd.) (B-2), a copolymer of ethylene with ethyl acrylate copolymer (manufactured by Nippon Unicar Co., Ltd.) (B-3) or a maleic-anhydride-modified polypropylene (Sumitomo Noblen manufactured by Sumitomo Chemical Co., Ltd.) (B-4) was used

TABLE 2

|  | Unit | Ex. 6 | Ex. 7 | Ex. 8 | Ex. 9 | Ex. 10 | Ex. 11 | Comp. Ex. 4 | Comp. Ex. 5 | Comp. Ex. 6 | Comp. Ex. 7 | Comp. Ex. 8 |
|---|---|---|---|---|---|---|---|---|---|---|---|---|
| (A) SIP-modified PBT | pt. wt. | 95 (A-2) | 50 (A-2) | 25 (A-2) | 25 (A-2) | 5 (A-2) | 45 (A-2) | — | — | — | — | — |
| SIP content | mol % | 1 | 1 | 1 | 1 | 1 | 1 |  |  |  |  |  |
| (B-I) B-1 | pt. wt. | 5 | 50 | 50 | 75 | 95 | 5 | 5 | 50 | 75 | 95 | 100 |
| (C) PBT | pt. wt. | — | — | 25 | — | — | 50 | 95 | 50 | 25 | 5 | — |
| dispersed particle diameter | μm | 0.3 | * | * | 0.4 | 0.4 | 0.4 | 2 | ** | 5 | 4 | — |
| tensile strength | kg/cm$^2$ | 559 | 412 | 416 | 350 | 285 | 561 | 544 | 405 | 336 | 271 | 262 |
| tensile elongation | % | not broken | 59 | 52 | not broken | not broken | not broken | 110 | 28 | 80 | 105 | not broken |
| notched Izod impact value | kg.cm/cm | 5.9 | 18.4 | 18.0 | 38 | 42 | 5.3 | 2.7 | 10.1 | 15.1 | 25 | 52 |
| surface layer peeling |  | free | free | free | free | free | free | peeled | peeled | peeled | peeled | peeled |
| fusibility (to PBT) | kg/cm | >4 | 3.5 | 3.1 | 3.1 | 0.9 | >4 | >4 | 2.2 | 1.5 | 0.5 | 0.1 |
| fusibility (to polyethylene) | kg/cm | 0.8 | 2.9 | 2.7 | >4 | >4 | 0.6 | 0.3 | 1.5 | >4 | >4 | >4 |

Note)
*dense reticulate structure
**coarse reticulate structure (partially bulky)

EXAMPLES 12 TO 16 AND COMPARATIVE EXAMPLE 19 TO 12

Compositions were prepared, molded and evaluated in the same manner as that described above, except that, as the component (B-I). The results are given in Table 3.

TABLE 3

|  | Unit | Ex. 12 | Ex. 13 | Ex. 14 | Ex. 15 | Ex. 16 | Comp. Ex. 9 | Comp. Ex. 10 | Comp. Ex. 11 | Comp. Ex. 12 |
|---|---|---|---|---|---|---|---|---|---|---|
| (A) SIP-modified PBT | pt. wt. | — | — | 75 (A-2) | 75 (A-2) | 75 (A-2) | — | — | — | — |
| (A) SIP-modified PET | pt. wt. | 75 (A-4) | 10 (A-4) | — | — | — | — | — | — | — |
| SIP content | mol % | 1 | 1 | 1 | 1 | 1 | — | — | — | — |
| (B-1) B-1 | pt. wt | 25 | 25 | — | — | — | 25 | — | — | — |
| (B-1) B-2 | pt. wt | — | — | 25 | — | — | — | 25 | — | — |
| (B-1) B-3 | pt. wt | — | — | — | 25 | — | — | — | 25 | — |
| (B-1) B-4 | pt. wt | — | — | — | — | 25 | — | — | — | 25 |
| (C) PBT | pt. wt | — | 65 | — | — | — | — | 75 | 75 | 75 |
| (C) PET | pt. wt | — | — | — | — | — | 75 | — | — | — |
| dispersed particle diameter | μm | 0.2 | 0.5 | 0.5 | 0.4 | 0.7 | 1.0 | 2.0 | 2.0 | 8.0 |
| tensile strength | kg/cm$^2$ | 495 | 505 | 650 | 451 | 483 | 481 | 628 | 462 | 475 |
| tensile elongation | % | 150 | 102 | 85 | 150 | 69 | 59 | 47 | 85 | 17 |
| notched Izod impact value | kg.cm/cm | 15.8 | 15.1 | 4.7 | 10.2 | 8.3 | 6.3 | 3.2 | 8.7 | 2.5 |
| surface layer peeling |  | free | free | free | free | free | peeled | peeled | peeled | peeled |

TABLE 3-continued

|  | Unit | Ex. 12 | Ex. 13 | Ex. 14 | Ex. 15 | Ex. 16 | Comp. Ex. 9 | Comp. Ex. 10 | Comp. Ex. 11 | Comp. Ex. 12 |
|---|---|---|---|---|---|---|---|---|---|---|
| fusibility (to PBT) | kg/cm | >4 | >4 | >4 | >4 | >4 | >4 | >4 | >4 | >4 |
| fusibility (to polyethylene) | kg/cm | 3.1 | 1.9 | 3.0 | 2.4 | 1.4 | 0.8 | 1.5 | 1.0 | 0.2 |

EXAMPLES 17 AND 18

Compositions were prepared, molded and evaluated in the same manner as that described above, except that a copolymer containing 1% by mole of sodium p-dihydroxyethoxyphenylsulfonate (HEPS) (A-5) was used as the component (A). The results are given in Table 4.

TABLE 4

|  | Unit | Ex. 17 | Ex. 18 |
|---|---|---|---|
| (A) HEPS-modified PBT | pt. wt. | 75 (A-5) | 10 (A-5) |
| HEPS content | mol % | 1 | 1 |
| (B-I) B-1 | pt. wt. | 25 | 25 |
| (C) PBT | pt. wt. | — | 65 |
| dispersed particle diameter | μm | 0.3 | 0.5 |
| tensile strength | kg/cm² | 497 | 498 |
| tensile elongation | % | 150 | 103 |
| notched Izod impact value | kg.cm/cm | 10.3 | 9.6 |
| surface peeling |  | free | free |
| fusibility (to PBT) | kg/cm | >4 | >4 |
| fusibility (to polyethylene) | kg/cm | 1.5 | 1.5 |

B. Composition II

Figure 2:
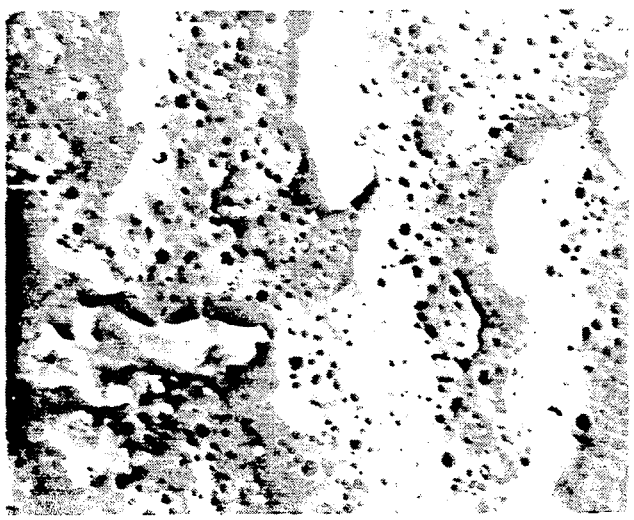
FIG. 2 is an electron photomicrograph showing a representative particle structure in a dispersed state associated with another composition according to this invention which was prepared in accordance with Example 20 below.

Evaluations and measurements were conducted by the following techniques:

Evaluation of resin dispersibility: When the polyamide (B-II) was a minor component, the state of dispersion for nylon 66 was evaluated by breaking the pellets in liquid nitrogen, placing the broken pellets in an aqueous 1 N hydrochloric acid solution, refluxing the mixture at 60° C. for 12 hours to decompose and elute the nylon 66 resin and observing the resultant holes under an electron microscope. On the other hand, in the case of nylon 12, the evaluation was conducted in the same manner as that described above, except that the elution was conducted through the use of cresol. The denser the dispersion and the smaller the dispersed particle diameter, the better the dispersibility. A representative state of particle dispersion (Example 20) according to the present invention is shown in FIG. 2. The state of particle dispersion (Comparative Example 13) corresponding to this case which is outside the scope of the present invention is shown in FIG. 4.

When the polyester components (A+C) was a minor component, the pellets were crushed or cut and treated in a 1 N aqueous NaOH solution at 60° C. for 24 hours to decompose and elute the polyester, and the resultant holes were evaluated in the same manner as that described above.

Tensile strength and elongation, Notched Izod impact value and Surface peeling test: Conducted in the same manner as those described above in connection with Composition I.

Polyester Copolymer (A): Copolymers (A-1), (A-2), (A-3), (A-4) and (A-5) which were produced for Composition I were used.

EXAMPLES 19 TO 23

According to the formulations specified in Table 5, (A) a polybutylene terephthalate copolyester resin copolymerized with a sodium 5-sulfoisophthalate (SIP) component in an amount of 0.1% by mole, 1.0% by mole or 5% by mole (A-1, A-2 and A-3), (B-II) nylon 66 resin (manufactured by Polyplastics Co., Ltd.) and, if necessary, (C) polybutylene terephthalate (PBT) (manufactured by Polyplastics Co., Ltd.) were mixed with each other in proportions specified in Table 5. The mixture was melt-kneaded by means of a 30-mm twin screw extruder at a preset temperature of 280° C. and a speed of rotation of a screw of 80 rpm and then pelletized. Subsequently, a specimen was prepared from the pellet by means of an injection molding machine, and properties were evaluated. The results are given in Table 5.

COMPARATIVE EXAMPLES 1, 2 AND 13

For comparison, a composition consisting of a modified PET (A) alone, a composition consisting of polybutylene terephthalate (PBT) (C) alone and a composition comprising a two-component system of the components (B-II) and (C) free from the modified PBT (A) were evaluated in the same manner as that described in the above-described Examples. The results are given in Table 5.

TABLE 5

|  | Unit | Ex. 19 | Ex. 20 | Ex. 21 | Ex. 22 | Ex. 23 | Comp. Ex. 1 | Comp. Ex. 2 | Comp. Ex. 13 |
|---|---|---|---|---|---|---|---|---|---|
| (A) SIP-modified PBT | pt. wt. | 75 (A-1) | 75 (A-2) | 75 (A-3) | 10 (A-3) | 10 (A-2) | — | 100 (A-2) | — |
| SIP content | mol % | 0.1 | 1 | 5 | 5 | 1 |  | 1 |  |
| (B-II) nylon 66 | pt. wt. | 25 | 25 | 25 | 25 | 25 | — | — | 25 |
| (C) PBT | pt. wt. | — | — | — | 65 | 65 | 100 | — | 75 |
| dispersed particle diameter | μm | 0.4 | 0.1 | 0.05 | 0.1 | 0.4 | — | — | 1.5 |
| tensile strength | kg/cm² | 611 | 624 | 620 | 624 | 612 | 567 | 560 | 605 |
| tensile elongation | % | 56 | not broken | 78 | not broken | 67 | not broken | 47 | 15 |
| notched Izod impact value | kg.cm/cm | 4.7 | 10.6 | 9.2 | 11.2 | 5.8 | 3.8 | 2.6 | 2.4 |
| surface layer peeling |  | free | free | free | free | free | free | free | peeled |

EXAMPLES 24 TO 29 AND COMPARATIVE EXAMPLES 14 TO 18

Molded pieces were prepared and evaluated in the same manner as that used in the above-described Examples 19 to 23 and Comparative Examples 1, 2 and 13, except that the amount of blending of the components (A), (B-II) and (C) were varied as specified in Table 6. The results are given in Table 6.

TABLE 6

|  | Unit | Ex. 24 | Ex. 25 | Ex. 26 | Ex. 27 | Ex. 28 | Ex. 29 | Comp. Ex. 14 | Comp. Ex. 15 | Comp. Ex. 16 | Comp. Ex. 17 | Comp. Ex. 18 |
|---|---|---|---|---|---|---|---|---|---|---|---|---|
| (A) SIP-modified PBT | pt. wt. | 95 (A-2) | 50 (A-2) | 25 (A-2) | 25 (A-2) | 5 (A-2) | 45 (A-2) | — | — | — | — | — |
| SIP content | mol % | 1 | 1 | 1 | 1 | 1 | 1 |  |  |  |  |  |
| (B-II) nylon 66 | pt. wt. | 5 | 50 | 50 | 75 | 95 | 5 | 5 | 50 | 75 | 95 | 100 |
| (C) PBT | pt. wt. | — | — | 25 | — | — | 50 | 95 | 50 | 25 | 5 | — |
| dispersed particle diameter | μm | 0.1 | * | * | 0.3 | 0.2 | 0.4 | 1.3 | ** | 2 | 1.5 | — |
| tensile strength | kg/cm² | 577 | 662 | 665 | 713 | 770 | 571 | 541 | 660 | 706 | 758 | 786 |
| tensile elongation | % | not broken | 59 | 57 | not broken | not broken | not broken | 70 | 32 | 14 | 46 | not broken |
| notched Izod impact value | kg.cm/cm | 5.9 | 10.1 | 9.7 | 11.5 | 13.3 | 5.6 | 2.1 | 4.9 | 5.4 | 6.9 | 12.1 |
| surface layer peeling |  | free | free | free | free | free | free | peeled | peeled | peeled | peeled | free |

Note)
*dense reticulate structure
**coarse reticulate structure

EXAMPLES 30 TO 33 AND COMPARATIVE EXAMPLES 19 TO 21

Compositions were prepared, molded and evaluated in the same manner as that described above, except that, in one case, the component (A) was changed to a modified polyethylene terephthalate resin (PET) (SIP: 1% by mole) (A-4) and, in another case, nylon 12 resin (manufactured by Daicel Hols Co., Ltd.) was used as the components (B-II). The results are given in Table 7.

TABLE 7

|  | Unit | Ex. 30 | Ex. 31 | Ex. 32 | Ex. 33 | Comp. Ex. 19 | Comp. Ex. 20 | Comp. Ex. 21 |
|---|---|---|---|---|---|---|---|---|
| (A) SIP-modified PBT | pt. wt. | — | — | 75 (A-2) | 10 (A-2) | — | — | — |
| (A) SIP-modified PET | pt. wt. | 75 (A-4) | 10 (A-4) | — | — | — | — | — |
| SIP content | mol % | 1 | 1 | 1 | 1 |  |  |  |
| (B-II) nylon 66 | pt. wt. | 25 | 25 | — | — | 25 | 25 | — |
| (B-II) nylon 12 | pt. wt. | — | — | 25 | 25 | — | — | 25 |
| (C) PBT | pt. wt. | — | 65 | — | 65 | — | 65 | 75 |
| (C) PET | pt. wt. | — | — | — | — | 75 | 10 | — |
| dispersed particle diameter | μm | 0.1 | 0.4 | 0.2 | 0.5 | 1.3 | 1.5 | 1.5 |
| tensile strength | kg/cm² | 586 | 620 | 528 | 531 | 558 | 610 | 502 |
| tensile elongation | % | not broken | 77 | not broken | not broken | 85 | 20 | 68 |
| notched Izod impact value | kg.cm/cm | 5.5 | 6.4 | 7.8 | 7.5 | 1.8 | 2.3 | 4.5 |
| surface peeling |  | free | free | free | free | peeled | peeled | peeled |

EXAMPLES 34 AND 35

Compositions were prepared, molded and evaluated in the same manner as that described above, except that a copolymer containing 1% by mole of sodium p-dihydroxyethoxyphenylsulfonate (HEPS) (A-5) was used as the component (A). The results are given in Table 8.

TABLE 8

|  | Unit | Ex. 34 | Ex. 35 |
|---|---|---|---|
| (A) HEPS-modified PBT | pt. wt. | 75 (A-5) | 10 (A-5) |
| HEPS content | mol % | 1 | 1 |
| (B-II) nylon 66 | pt. wt. | 25 | 25 |
| (C) PBT | pt. wt. | — | 65 |
| dispersed particle diameter | μm | 0.2 | 0.4 |
| tensile strength | kg/cm² | 616 | 618 |
| tensile elongation | % | 105 | 81 |
| notched Izod impact value | kg.cm/cm | 7.4 | 6.3 |
| surface peeling |  | free | free |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A moldable polyester resin composition comprising, based on the total weight of all resin components:
   (A) between 2 to 98% by weight of a compatibilizing metal sulfonate group-containing aromatic polyester copolymer which is the polycondensation reaction product of (a) an aromatic dicarboxylic acid or a lower alkyl ester of an aromatic dicarboxylic acid, (b) a diol compound, and (c) an ester-forming compound containing a metal sulfonate group;

(B) between 2 to 98% by weight of an olefin copolymer additive resin which is the copolymerization reaction product between an olefin with at least one of an α,β-unsaturated carboxylic acid or its derivative and/or a vinyl alcohol or its ester; and optionally (C) between 0 to 96% by weight of a non-compatibilizing aromatic polyester resin which is the polycondensation reaction product of (a) an aromatic dicarboxylic acid and (b) a diol compound or its ester-forming derivative, and wherein the ester-forming compound containing a metal sulfonate group is represented by the formulas (I) and/or (II):

$$(XOCO)_m\text{—}Ar\text{—}(SO_3)M)_n \qquad (I)$$
$$(HORO)_m\text{—}Ar\text{—}(SO_3)M)_n \qquad (II)$$

wherein -Ar- represents a benzene ring or a naphthalene ring; X represents a hydrogen atom or a lower alkyl group; m and n are each 1 or 2; M represents an alkali metal selected from the group consisting of lithium, sodium and potassium, with the proviso that when n is 2, the M moieties may be the same or different; and R represents a divalent group selected from among —$CH_2CH_2$—, —$CH(CH_3)CH_3$—, —$CH_2CH(CH_3)$—, and —$CH_2CH_2OCH_2CH_2$—.

2. The moldable polyester resin composition as in claim 1, wherein the ester-forming compound containing a metal sulfonate group represented by the general formulas (I) and/or (II) is introduced into the main polymer chain of component (A) in an amount within the range between 0.01 to 15% by mole.

3. A molded article which consists essentially of the moldable polyester resin composition according to any one of the previous claims.

* * * * *